Feb. 23, 1932.  F. W. HOCHSTETTER  1,846,054
COMBINATION SHUTTER AND COLOR FILTER FOR
THE MOTION PICTURE PROJECTION ARTS
Filed Oct. 29, 1928
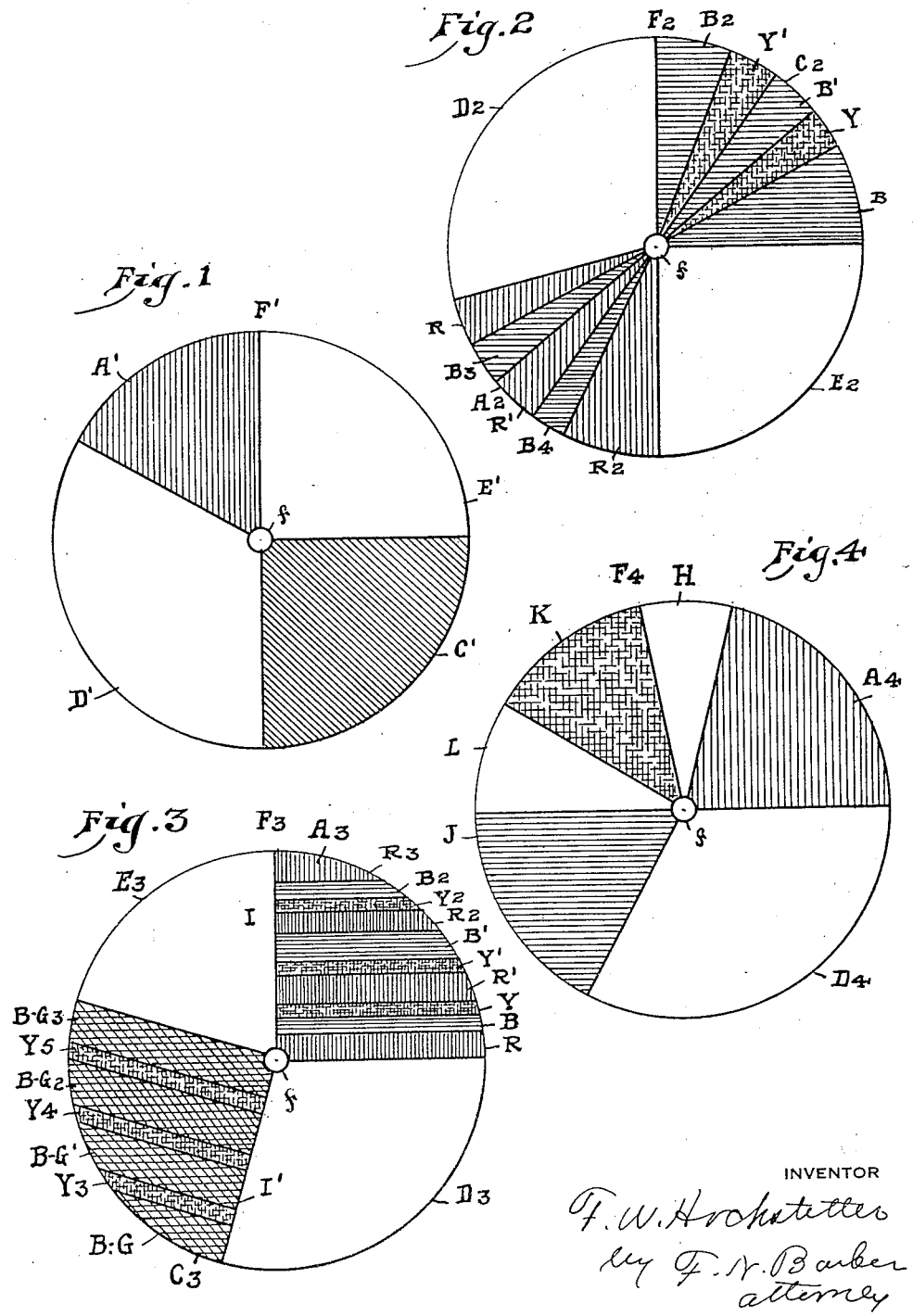
INVENTOR
F. W. Hochstetter
by F. N. Barber
attorney Patented Feb. 23, 1932

1,846,054

UNITED STATES PATENT OFFICE

FREDERICK W. HOCHSTETTER, OF PITTSBURGH, PENNSYLVANIA

COMBINATION SHUTTER AND COLOR FILTER FOR THE MOTION PICTURE PROJECTION ARTS

Application filed October 29, 1928. Serial No. 315,605.

My invention relates to combination shutters and color filters for motion picture projection machines.

The main object of this invention is to provide a combined shutter and color filter for projecting motion pictures in natural colors from monochromatic positive films printed from negatives recorded on panchromatic films containing color values in monochromatic gradation. Negatives reversed into positives may be used for projection, if desired.

Another object is to provide a method whereby motion pictures are projected in natural colors from black and white positive films at the standard or normal speed now practiced in the art. By the present invention I may employ the standard equipment now used. I materially reduce the cost of producing and projecting motion pictures in natural colors because projection is carried on at standard or normal speed whereby less film is consumed.

Heretofore attempts have been made to produce motion pictures for projection in natural colors from monochromatic film, but in some instances known to me single color filters were used and for each image a filter for a different color employed. The different filtered images so made were superimposed and fed at a higher than standard or normal rate of speed. All these attempts were found to be impracticable commercially, due to scientific, technical and economic reasons. Some of these attempts were failures due to their requiring a different equipment from that in use. In those attempts there were other drawbacks, such as flicker, color fringe and exaggerated color effects.

In carrying out this invention, I first photograph and produce motion picture negatives on a panchromatic film at standard or normal speed by using a correction filter so that all color values are recorded in each image. After exposing, the negative is developed and finished in the usual or other satisfactory way.

Positive films are printed from the negatives whereby all the color values recorded in monochromatic gradation are transferred to the positives. The positive films are produced in accordance with the well known practice of making black and white images. These positives are projected by any standard projection machine, with which my combination shutter and color filter may be used in place of the standard shutter, or in addition thereto.

Referring to the accompanying drawings, Fig. 1 is a diagrammatic face view of a combination shutter and color filter forming one feature of this invention. Figs. 2, 3 and 4 show modifications of Fig. 1.

Referring now to my invention in connection with the shutter and color filter shown in Fig. 1, A′, C′, D′ and E′ designate sectors of the rotary disk F′, the latter having a central opening $f$, which is at the axis or center of rotation of the disk. The sectors A′ and C′ are transparent and are colored red and green, respectively, the sector A′ occupying approximately 60° and the sector C′ 90°. The sectors D′ and E′ are opaque and occupy respectively 120° and 90°.

In Fig. 2, the sectors A2, C2, D2 and E2 on the disk F2 correspond to the sectors A′, C′, D′ and E′, respectively on the disk F′; but differ in the following respects therefrom: the colored sector A2 covers 77° of the disk F2; the colored sector C2, 90°; the opaque sector D2, 103°; and the opaque sector E2, 90°; the colored sector C2 is divided into the consecutive sub-sectors B, Y, B′, Y′, B2, the letters B and Y also denoting the colors blue and yellow, respectively, applied to the sub-sectors; and the colored sector A2 is divided into consecutive sub-sectors R, B3, R′, B4 and R2, the letters R and B denoting also the colors red and blue, respectively. The sub-sectors B and R2 cover 28° each; the sub-sectors Y, R and B3, 12° each; the sub-sectors B′, Y′ and R′, 15° each; the sub-sector B2, 20°; and the sub-sector B4, 10°.

In Fig. 3, the sectors A3, C3, D3 and E3 on the disk F3 correspond to the sectors A′, C′, D′ and E′, respectively, on the disk F′, and to the sectors A2, C2, D2 and E2, respectively, on the disk F2. In Fig. 3, the colored sectors A3 and C3 occupy 90° each, while the opaque sectors D3 and E3 occupy 105° and 75°, respectively. The sector A3 has the successive colored bands R, B, Y, R', Y', B', R2, Y2, B2 and R3, extending at right angles from the radius I to the arc of the sector A3, the letters R, B and Y also denoting the colors red, blue and yellow, respectively. The width of the several bands in percentages of the length of the radius, against which they abut are as follows: R, 12%; B, 8%; Y, Y' and Y2, 5% each; R' and B', 15% each; R2 and B2, 10% each; and R3, 15%. The sector C3 has the successive colored bands B—G, Y3, B—G', Y4, B—G2, Y5, and B—G3, the letters B, G and Y also denoting the colors blue, green and yellow, respectively, and the combination letters B—G meaning a combination of blue and green colors. The width of each of the three yellow bands in percentage of the radius I' from which they extend to the arc of the sector C3 is 8%, and the width of each of the four blue-green bands, 19%.

In Fig. 4, the three opaque sectors D4, L and H occupy respectively 120°, 30° and 25° on the disk F4. The transparent sectors A4, J and K are colored red, blue and yellow, respectively and occupy 75°, 60° and 45°, respectively, on the disk F4. The red sector A4 is between the opaque sectors D4 and H. The blue sector J is between the opaque sectors D4 and L. The yellow sector K is between the opaque sectors L and H.

Any selected disk is caused to rotate in a plane transverse of the path of the light projected from the projection machine through the film to the screen, the several sectors on the disk passing in succession across the said path of light. The selected disk has a greater speed than the film so that each image will be affected by all the color sectors and sub-sectors, or divisions, of the color sectors, and so that the opaque sectors D', D2, D3 and D4 will move across the path of the projected beam of light during the time the film moves to change the projection from one image to the next. The other opaque sectors intercept the projected light during the period when the disk is moving one color sector away from the beam of projected light and the next color sector into the said beam.

The opaque sectors D', D2, D3 and D4 perform the function of the standard shutter in projection machines, namely, to cut off the projection of light during the periods when images on the film are being moved intermittently across the path of the projected beam of light.

The disks bearing the combination shutters and color filters rotate preferably between the light source and the film, but they may be placed in between the film and the projection lens or in any other suitable position.

The four forms of my combination disks illustrated in Figs. 1 to 4 show only a few of the many ways in which disks may be divided into sectors and sub-sectors or divisions, containing transparent colored and opaque areas or portions. The colors may be variously arranged and proportioned in the segments, and the degrees the various colors occupy may be changed to get desired results.

I claim:—

1. A rotary color filter having opposite colored transparent areas alternating with opaque shutter areas, one colored area having segments containing red color with segments of blue color intervening, and the other colored area having segments containing blue color with segments of yellow color intervening.

2. A rotary color filter having opposite colored transparent areas alternating with opaque shutter areas, one colored area having segments containing red color with segments containing blue and yellow colors intervening, and the other colored area having segments containing blue-green with segments containing yellow intervening.

In testimony whereof I hereunto affix my signature.

FREDERICK W. HOCHSTETTER.